May 1, 1923.
C. S. MARTIN
DEMOUNTABLE TIRE RIM
Filed April 10, 1922
1,453,633
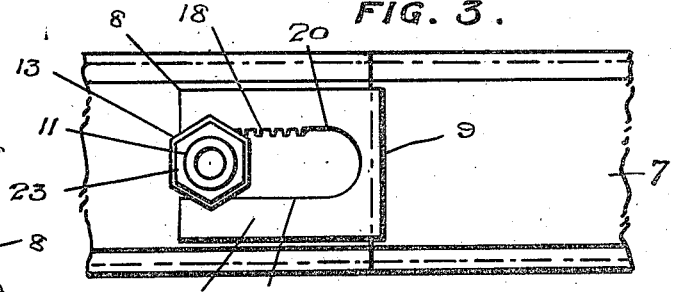
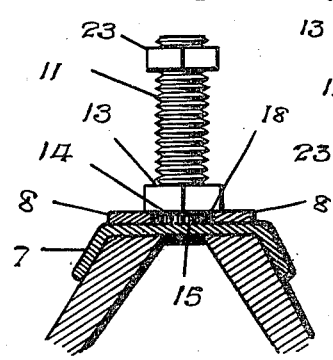
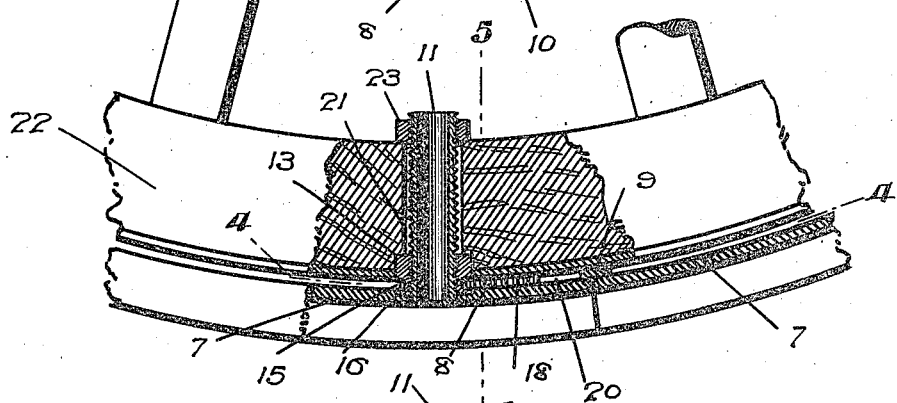
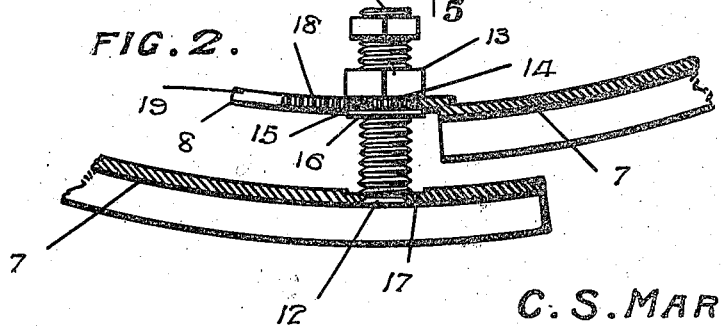
Inventor
C. S. MARTIN,
By W. J. Fitz Gerald & Co.
Attorney.

Patented May 1, 1923.

1,453,633

UNITED STATES PATENT OFFICE.

CLEMENT S. MARTIN, OF ROCKVILLE, MARYLAND.

DEMOUNTABLE TIRE RIM.

Application filed April 10, 1922. Serial No. 551,085.

*To all whom it may concern:*

Be it known that I, CLEMENT S. MARTIN, a citizen of the United States, residing at Rockville, in the county of Montgomery and State of Maryland, have invented certain new and useful Improvements in Demountable Tire Rims; and I do hereby declare the following to be a full, clear, and exact description of the invention, such as will enable others skilled in the art to which it appertains to make and use the same.

The present invention relates to demountable rims for pneumatic tires, and aims to provide a demountable tire rim having novel and improved means for contracting and expanding the rim to facilitate the removal and application of the tire.

Another object of the invention is to combine with the rim a compact, simple and efficient device for moving the end portions of the rim toward and away from one another for contracting and expanding the rim in a convenient and practical manner.

A further object is the provision of such a device which is also operable for separating the ends of the rim to assist in the contraction of the rim.

A still further object is the provision of such a device comprising a rotatable member carried by one end portion of the rim and a portion carried by the other end of the rim, said rotatable member and secondnamed portion having means to engage one another whereby the rotation of said member will contract or expand the rim according to the direction of rotation.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawing, wherein—

Figure 1 is a view, partly in elevation and partly in longitudinal section, showing the improved device with the rim in place on a wheel.

Fig. 2 is a longitudinal section of the end portions of the rim showing same separated to contract the rim, portions being shown in elevation.

Fig. 3 is a plan view of the joint of the rim.

Fig. 4 is a section on the line 4—4 of Fig. 1.

Fig. 5 is a cross section on the line 5—5 of Fig. 1 with the wheel felly omitted.

The rim 7 may be of any suitable cross section, according to the prevailing types, and is composed of suitable resilient or bendable metal. The rim is split or divided transversely at one point, and the ends thereof are adapted to abut when the rim is expanded to normal position. A tongue 8 projects from one end of the rim, and is offset inwardly therefrom, as at 9, to overlap the inner surface of the opposite end portion of the rim. The tongue or portion 8 has a longitudinal open ended slot 10 for receiving a post 11 projecting inwardly from the other end portion of the rim. The outer end of the post 11 is riveted or otherwise rigidly secured, as at 12, to the rim, and said post is preferably tubular so that it can receive the usual valve stem of the inner tube.

A rotatable member 13 is mounted on the post 11, and, in the arrangement as shown, the post is screw-threaded and the member 13 screwed on the post to move longitudinally on the post as well as rotate thereon. This member 13 provides both a nut or clamping member for clamping the tongue or portion 8 against the end portion of the rim to which the post is secured, and also as a means for moving the ends of the rim toward and away from one another, both circumferentially and radially as shown. The member 13 is formed adjacent to its outer end or face with an annular groove 14 receiving the edge portions of the tongue 8 along the edges of the slot 10, thereby slidably mounting the tongue 8 in the groove 14, but compelling the tongue 8 and corresponding end portion of the rim to move inwardly and outwardly with the member 13 when said member is rotated on the post 11. The member 13 is formed at the bottom of the groove 14 with the gear teeth 15 forming a gear wheel or pinion, and said member 13 has a flange 16 overlapping the outer surface of the tongue 8. The inner surface of the rim is formed around the base of the post 11 with a recess or depression 17 for receiving the flange 16 when the parts are clamped together, as seen in Fig. 1.

In order to move the ends of the rim longitudinally with reference to one another, the tongue 8 is provided along one edge of the slot 10 with teeth forming a rack 18 to mesh with the teeth or pinion portion 15 of the member 13, and there are smooth arcuate portions 19 and 20 beyond the ends of the rack 18 for the turning movement of the pinion 15 without moving the rack 18.

The post 11 is inserted inwardly through an opening 21 in the wheel felly 22, which opening is made slightly larger than the usual opening for the valve stem of the tire, the valve stem projecting through the post 11. It is preferable to screw a nut 23 on the post to bear against the inner periphery of the felly. The post fitting within the opening will prevent any longitudinal creeping or displacement of the rim on the felly. By removing the nut 23, the opposite portion of the rim can be shifted off of the felly, so that the rim can be moved to withdraw the post 11 from the opening 21. In applying the rim to the felly the post 11 is inserted through the opening 21 and the rim then shifted laterally onto the felly, similar to the manner of applying an ordinary demountable rim.

When the rim is in expanded normal position, the ends thereof abut one another, and the pinion 15 fits the smooth arcuate portion 19 at the end of the slot 10, the member 15 being rotated to clamp the tongue 8 against the end portion of the rim which it overlaps, as seen in Fig. 1, and the flange 15 is seated in the recess or depression 17. To contract the rim, after it has been removed from the felly, the member 13 is rotated on the post 11 to move it away from the base of the post, thereby separating the end portions of the rim, and when such end portions are separated, the rack 18 can move into engagement with the pinion 15, so that the further rotation of the member 15 will cause the end portions of the rim to be moved longitudinally toward one another, as seen in Fig. 2. The end portions of the rim are therefore not only separated radially but are also moved longitudinally together, to contract the rim so that the tire can be readily removed therefrom and replaced. After the rack 18 has been moved by the pinion 15, the smooth arcuate portion 20 engages the pinion, thereby permitting the member 13 to be rotated farther, without moving the end portions of the rim longitudinally, but to separate said end portions radially farther, if desired.

When the tire has been placed on the rim, with the rim in contracted position, the rim is easily expanded by rotating the member 13 in the reverse direction, causing the pinion 15 to move the rack 18 so as to move the end portions of the rim longitudinally away from one another, until the smooth portion 19 comes into engagement with the pinion 15, which will stop such longitudinal separation of the end portions of the rim. However, by turning the member 13 farther, it is secrewed on the post 11 to the base thereof, thereby clamping the tongue 8 against the end portion of the rim which it overlaps, and holding the ends of the rim in abutment.

The present device thus provides a simple and effective means for conveniently separating the ends of the rim and contracting the rim for the removal and application of the tire, and by reversing the rotation of the member 13, the rim is again expanded and the ends thereof brought into position.

Having thus described the invention, what is claimed as new is:—

1. A transversely split tire rim, and a rotatable radial member having a screw connection with one end portion of the rim, the other end of the rim having a portion engaging said member to be moved thereby.

2. A transversely split tire rim, and a rotatable member having a screw connection with one end portion of the rim, and the other end of the rim having a portion engaging said member to be moved toward and away from the first-named portion, the last-named portion having a rack and the rotatable member having a pinion portion to engage and move the rack.

3. A transversely split tire rim, and a rotatable member having a screw connection with one end portion of the rim and having an annular groove and pinion, the other end of the rim having a slotted portion in which said member is disposed and engaged in said groove, said slotted portion having a rack to engage said pinion.

4. A transversely split tire rim, a rotatable member having a screw connection with one end portion of the rim and having an annular groove, and the other end of the rim having a slotted portion receiving said member and engaging in said groove.

5. A transversely split tire rim, a rotatable member having a screw connection with one end portion of the rim, and having a pinion, the other end of the rim having a portion engaging said member to move therewith toward and away from the first-named end portion, the last-named portion having a rack to be engaged by said pinion and having smooth portions at the ends of the rack to permit the pinion to turn after moving the rack.

6. A transversely split tire rim, a rotatable member having a screw connection with one end portion of the rim and having an annular groove and a pinion, the other end of the rim having a slotted portion receiving said member and engaging in said groove, said slotted portion having a rack to engage said pinion and smooth portions at the ends of the rack to permit the pinion to turn after moving the rack.

7. A transversely split tire rim, a post carried by one end portion of the rim, and a member rotatable on the post and movable longitudinally thereon, the other end of the rim having a portion to engage said member to be moved radially and longitudinally toward and away from the first-named end portion by the movements of said member on the post.

8. A transversely split tire rim, a post secured to one end portion of the rim, a rotatable member threaded on the post, and having a pinion, and a portion carried by the other end of the rim having a slidable connection with said member and a rack to engage said pinion.

9. A transversely split tire rim, a post secured to one end portion of the rim, and a member threaded on the post, the other end of the rim having a portion to engage said member and to be clamped against and moved away from the first-named end portion by said member.

10. A transversely split tire rim, a post secured to one end portion thereof, and a member rotatable on the post having a pinion, the other end of the rim having a rack to engage said pinion.

11. A transversely split tire rim, a post secured to one end portion thereof, and a member screw-threaded on the post having an annular groove and a pinion, the other end of the rim having a slotted portion receiving said member and engaging in said groove, the slotted portion having a rack to engage said pinion.

12. A transversely split tire rim, a post secured to one end portion of the rim, and a member screw-threaded on the post and having a pinion, the other end of the rim having a portion engaging said member and provided with a rack to engage said pinion and smooth portions at the ends of the rack to permit the pinion to turn after moving the rack.

13. A transversely split tire rim, a post secured to one end portion of the rim, and a member screw-threaded on the post and having an annular groove and a pinion, the other end of the rim having a slotted portion to overlap the first-named end portion and receiving said member, said slotted portion engaging in said groove and being provided with a rack to engage the pinion and smooth portions at the ends of the rack to permit the pinion to turn after moving the rack.

14. A transversely split tire rim, a tubular post secured to one end portion of the rim to receive the valve stem, and means movably mounted on said post for moving the end portions of the rim to contract and expand the rim.

15. A transversely split tire rim, and means assembled with the end portions of said rim and operable by screw action for displacing the end portions of the rim radially and then operable by gear action for moving said end portions longitudinally to contract the rim.

16. A transversely split tire rim, and means carried by one end portion of said rim operable for contracting and expanding the rim, the other end portion of the rim engaging said means, and said means being constructed and arranged to have a screw action for shifting the end portions radially relatively to one another and to have a gear action for moving them longitudinally relatively to one another.

In testimony whereof I have signed my name to this specification in the presence of two subscribing witnesses.

CLEMENT S. MARTIN.

Witnesses:
HENRY SCHILPP,
JAMES MILLS.